United States Patent [19]
Anglin

[11] 3,967,314
[45] June 29, 1976

[54] COLOR BRIGHTNESS CONTROL
[75] Inventor: Russell E. Anglin, San Jose, Calif.
[73] Assignee: Oneida Electronics, Meadville, Pa.
[22] Filed: Sept. 19, 1975
[21] Appl. No.: 614,978

[52] U.S. Cl............................. 358/29; 178/DIG. 4;
  313/409; 313/441; 315/13 CG; 315/30;
  315/106; 316/27; 316/28; 358/10; 358/65;
  358/74
[51] Int. Cl.².......................................... H04N 9/18
[58] Field of Search...... 178/7.5 R, DIG. 4, 7.5 DC;
  358/29, 64, 65, 74, 10; 313/409, 441; 315/13
  CG, 30, 106; 316/27, 28

[56] References Cited
UNITED STATES PATENTS

| 2,845,573 | 7/1958 | Macovski | 358/65 X |
| 2,866,124 | 12/1958 | Giuffrida et al. | 358/29 X |
| 2,877,923 | 3/1959 | Loughren | 315/13 CG |
| 3,301,943 | 1/1967 | Hansen | 358/29 X |

FOREIGN PATENTS OR APPLICATIONS

| 1,201,866 | 9/1965 | Germany | 358/29 |
| 1,195,757 | 6/1970 | United Kingdom | 358/29 |

Primary Examiner—Robert L. Richardson

[57] ABSTRACT

A means is disclosed for selectively increasing the emission of the several color guns of a color picture tube by placing a variable resistance between the control grid and the screen grid corresponding to each said color gun. This provides a source for increasing the voltage on the control grid of that color gun. As the voltage on the control grid is increased, the emission of that color gun is increased, thereby making it possible to blend the colors of the several color guns.

5 Claims, 2 Drawing Figures

COLOR BRIGHTNESS CONTROL

GENERAL STATEMENT OF INVENTION

A cathode ray tube used for the projection of a black and white picture contains an electron gun with a heater, cathode, control grid and screen grid. Three similar guns are contained in the color picture tube, known as the red gun, green gun and blue gun. These guns become low on emission after usage due to oxide buildups, element leakage and gassy elements. One gun can become low on emission and destroy the quality of the color picture.

In its basic concept, the invention disclosed herein, restores the brightness to a color picture tube in such a manner that any or all color guns that are weak or low on emission can be affected separately and the amount of emission can be controlled separately. The heater voltage is not affected and there is no damage to the picture tube.

The control according to the present invention will boost the output or emission on a color picture tube by raising the DC voltage on the control grid. This is accomplished by a variable resistance or potentiometer connected between the control grid and the screen grid for each color gun. As the potentiometer is lowered in resistance, voltage is increased on the control grid, raising the emission of that circuit.

The unit disclosed herein is constructed of three slide resistance controls. The controls are 5 megohms each with a 100,000 ohm stop. Each control is connected between the control grid and the screen grid of the three guns. A snap on cover is placed over the wires, which connect to an extension to the picture tube. The color on each gun can be varied by sliding the control in the proper direction. Emission is increased by moving the control toward the color gun. Assuming that the red gun is low on emission, which means that the red screen control has been advanced to the maximum and the red screen display is still too low, install the color brightness control and advance the red color blender potentiometer to a point where the proper amount of red color appears on the screen. The red potentiometer should be left at this setting and the other screen controls should be trimmed for a black and white picture. Any color gun or all guns can be adjusted in this manner.

REFERENCE TO PRIOR ART

The circuit disclosed herein shows an improvement over the circuit disclosed in U.S. Pat. Nos. 2,877,293; 2,757,316; 3,641,391; 3,313,538; 2,839,600; 2,742,522.

Restoration of emission of cathode ray tubes, and particularly color television picture tubes, heretofore, has involved the application of increased voltage on the tube filaments or heaters. There are many disadvantages of such procedures. The application of increased voltage can shorten the tube life by burning out the heater or cause the shorting of elements within the tube, due to thermal expansion of the metalic elements. When conventional brighteners are used on color picture tubes, all three guns are affected by the same amount of emission, when only perhaps one gun is low on emission and this amount of emission is not controlable.

Applicant has developed a different type of brightener, using an entirely different principal which does not cause shorting of the elements and the emission can be controlled on any or all guns of the picture tube. It is less expensive to manufacture, and it is more compact and more effective than the conventional brightener.

The control according to the present invention will boost the output or emission on a color picture tube by raising the DC voltage on the control grid. This is accomplished by a variable resistance or potentiometer connected between the control grid and the screen grid for each color gun. As the potentiometer is lowered in resistance, voltage is increased on the control grid, raising the emission of that circuit.

OBJECTS OF THE INVENTION

It is an object of the invention to provide an improved circuit for controlling the color emission of a color television picture tube.

Another object of the invention is to provide a control for the emission of the color guns of a color television picture tube which is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
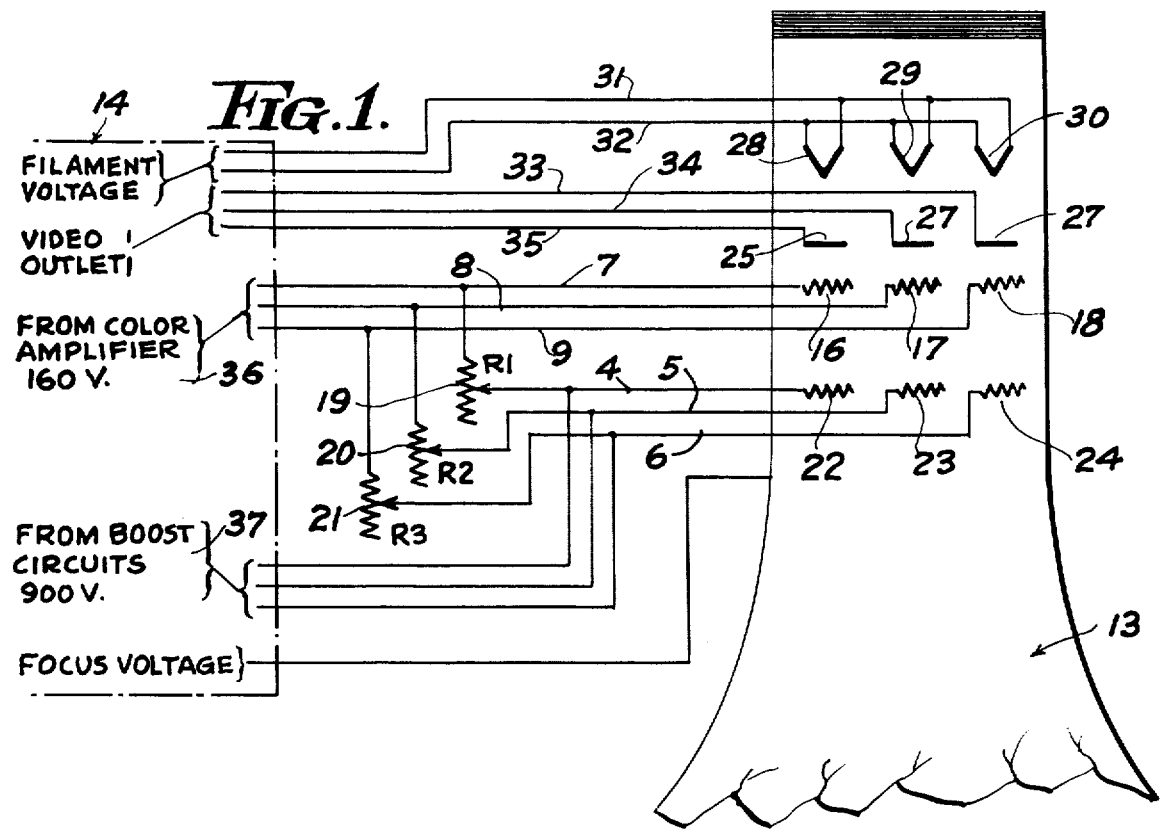
FIG. 1 is a schematic partial circuit diagram of a color television circuit according to the invention.
Figure 2:
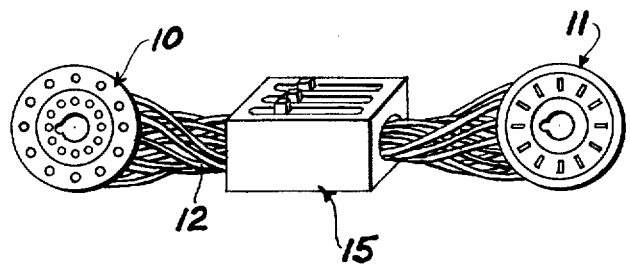
FIG. 2 is a view of the plugs, wiring and potentiometers according to the invention.

Now with more particular reference to the drawings, a television color brightness control is shown made up of a first plug 10, and a socket 11. The plug 10 is suitable to be plugged into the socket that ordinarily receives the base of the color picture tube in a color television circuit. The socket 11 is suitable to receive the pins of the base of a color television picture tube. The wires 12 connect the terminals of the plug 10 to those of the socket 11 with the potentiometer support 15 therebetween.

The plug 10 is adapted to be plugged into the socket 11 on the television set that ordinarily receives the base of the picture tube, indicated at 13, of a color television set 14. The second socket 11 is adapted to receive the pins of a color picture tube 13 having a first control grid 16, a second control grid 17 and a third control grid 18; a first screen grid 22, a second screen grid 23 and a third screen grid 24; a first color cathode 25, a second color cathode 26, and a third color cathode 27; a first heater 28, a second heater 29 and a third heater 30. The heaters are connected to the wires 31 and 32 from a suitable heater transformer or source of power. The cathodes 25, 26, and 27 are connected to the television circuit through suitable wires 33, 34, and 35 through the television color tube socket 11. The control grids 16, 17 and 18 are connected to a suitable color amplifier 36. The screen grids 22, 23, and 24 are connected to a suitable boost circuit 37 through wires G2B, G2G and G2R, that will be familiar to those skilled in the art.

Potentiometers 19, 20 and 21 have resistance elements R1, R2 and R3 of about 5 megohms. Potentiometer 19 is connected between the control grid 16 and the screen grid 22, to wires G1B and G2B. Potentiometer 20 is connected to wires G1G and G2G between control grid 17 and screen grid 23. Potentiometer 21 is connected to wires G1R and G2R between control grid 18 and screen grid 24. The potentiometers have a stop that prevents them from being reduced to zero, thereby preventing them from shorting out or a resistor of a fixed value could be connected in series with the potentiometer.

The circuit disclosed herein may be installed when the red, blue and green screen controls have been advanced to maximum yet the colors are not properly blended. The television color picture tube is then pulled out of its socket and the plug 10 and socket 11 inserted between the picture tube and the circuit. The potentiometers, 19, 20, and 21 are then adjusted to bring the colors of the picture tube to the proper blend.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

1. A television color brightness control for a color television tube having screen grids and control grids comprising,
   a first control grid, a second control grid and a third control grid,
   a first screen grid, a second screen grid and a third screen grid,
   a first potentiometer, a second potentiometer and a third potentiometer,
   means connecting said first potentiometer between said first control grid and said first screen grid,
   means connecting said second potentiometer between said second control grid and said second screen grid,
   means connecting said third potentiometer between said third control grid and said third screen grid whereby the resistance between said screen grids and said control grids can be adjusted thereby adjusting the positive voltage on said control grids.

2. The circuit recited in claim 1 wherein said circuit comprises,
   a plug and a socket,
   said plug being adapted to be connected to the color picture tube socket of a color television set,
   said second plug being adapted to receive the pins of a color picture tube socket with said potentiometers therebetween,
   and a support supporting said potentiometers between said plug and said socket.

3. A device interposed between a color picture tube having a red control grid, a red screen grid,
   a blue control grid, a blue screen grid,
   a green control grid and a green screen grid and,
   a circuit socket adapted to receive said color picture tube base,
   said device being adapted to improve color blending comprising a device socket receiving said picture tube base and a device plug received in said circuit socket,
   a first potentiometer and a second potentiometer and a third potentiometer,
   means supporting said potentiometers,
   said first potentiometer being connected between said red control grid and said red screen grid,
   said second potentiometer being connected between said blue control grid and said blue screen grid,
   said third potentiometer being connected between said green control grid and said green screen grid whereby the voltage on said control grids can be selectively controlled thereby improving color blending in said picture tube.

4. The device recited in claim 3 wherein said potentiometers have a value in the range of 5 meg. ohm.

5. The device recited in claim 3 wherein said potentiometers have a stop at aproximately 100,000 ohms.

* * * * *